United States Patent
Wright et al.

[11] Patent Number: 5,956,934
[45] Date of Patent: Sep. 28, 1999

[54] FOLDING FINGER WHEEL V-RAKE

[75] Inventors: Charles Michael Wright, Ogden; Jeffrey Lee Mohr, St. Joseph, both of Ill.

[73] Assignee: Ogden Metalworks, Inc., Ogden, Ill.

[21] Appl. No.: 09/021,908

[22] Filed: Feb. 11, 1998

[51] Int. Cl.[6] .................................................. A01D 78/14
[52] U.S. Cl. ............................... 56/377; 56/367; 172/311
[58] Field of Search .............................. 56/365, 366, 367, 56/375, 376, 377, 15.9, DIG. 14, DIG. 10, DIG. 21; 172/311; 171/63, 65

[56] References Cited

U.S. PATENT DOCUMENTS

| | | | |
|---|---|---|---|
| 2,499,867 | 3/1950 | Jones | 56/121.4 |
| 2,689,446 | 9/1954 | Sorrels | 56/377 |
| 2,710,519 | 6/1955 | Winter | 56/377 |
| 3,406,509 | 10/1968 | Wood | 56/377 |
| 3,706,191 | 12/1972 | Barbot | 56/377 |
| 4,920,735 | 5/1990 | Bailey et al. | 56/14.9 |
| 4,974,407 | 12/1990 | Rowe et al. | 56/377 |
| 5,031,705 | 7/1991 | Clemens | 172/6 |
| 5,127,216 | 7/1992 | Kelderman | 56/15.9 |
| 5,231,829 | 8/1993 | Tonutti | 56/377 |
| 5,263,306 | 11/1993 | Tonutti | 56/377 |
| 5,598,691 | 2/1997 | Peeters | 56/377 |

OTHER PUBLICATIONS

"Harvestman" the new Enrossi "V" rake, Enoagricola Rossi s.r.l, brochure. (no date).

H & S Bi–Fold Wheel Rake, H & S Manufacturing Co. Inc., brochure. (no date).

*Primary Examiner*—Robert Pezzuto
*Attorney, Agent, or Firm*—Grace J. Fishel

[57] ABSTRACT

A folding finger wheel V-rake with right and left movable heads independently rotatable on a carrier between operating and upside down position for transport, the same mechanism facilitating intermediate lifting of the finger wheels out of contact with the ground.

10 Claims, 4 Drawing Sheets

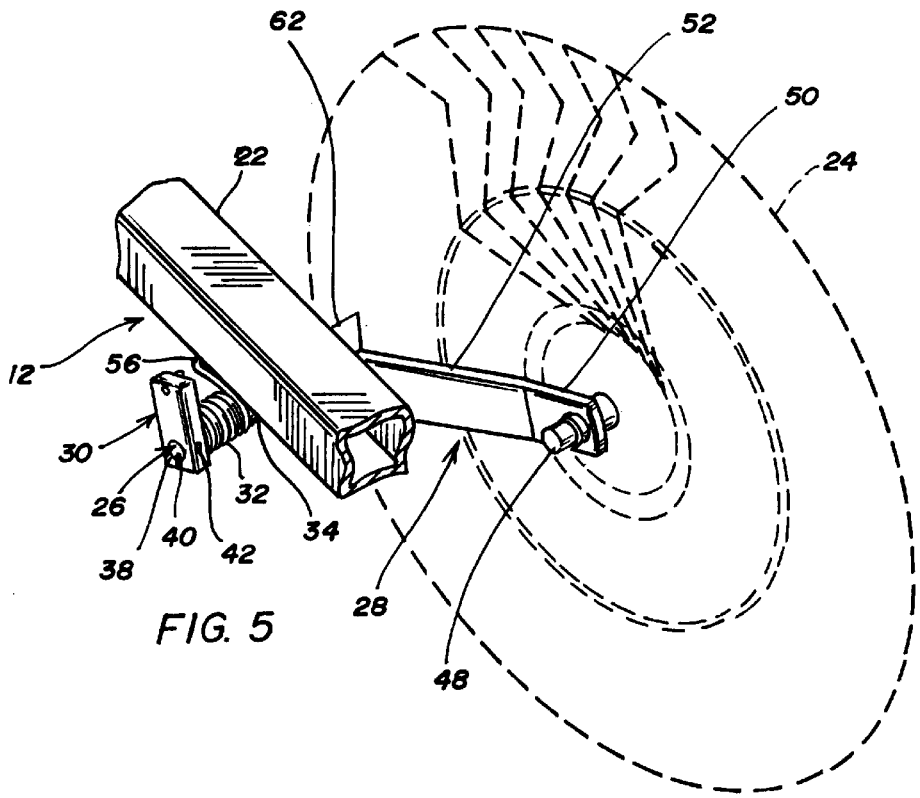
FIG. 5
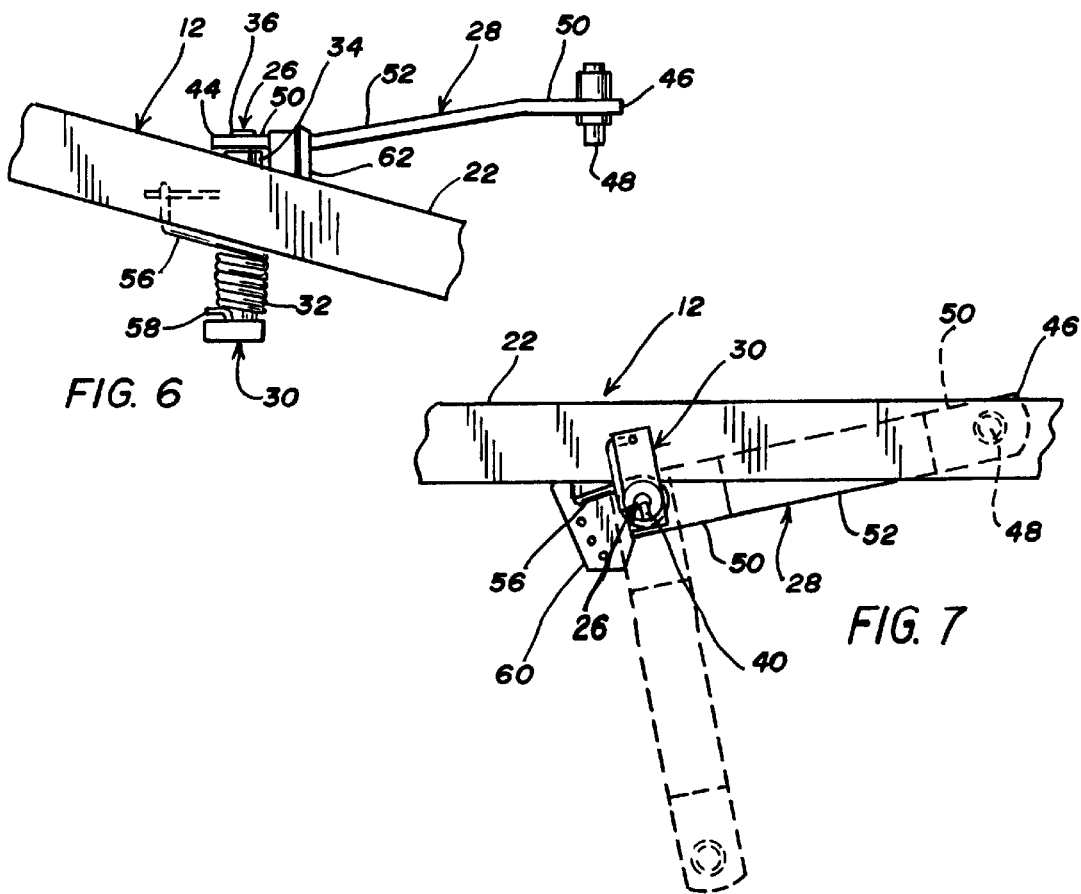
FIG. 6
FIG. 7

FOLDING FINGER WHEEL V-RAKE

BACKGROUND OF THE INVENTION

1. Field of the Invention

The present invention relates to a folding finger wheel V-rake wherein right and left movable heads are independently rotatable between operating and upside down position for transport, the same mechanism facilitating intermediate lifting of the finger wheels out of contact with the ground.

2. Brief Description of the Prior Art

Modern finger wheel V-rakes employ right and left heads, each of which has a plurality of rotating tined wheels supported on a frame. The frames are sloped so that when they are towed sideways across a field of cut forage they form a windrow. There are large V-rakes with 16 to 20 finger wheels, capable of raking a 40 foot swath. These units, however, are not suitable for rolling terrain, nor are they adapted for use on small or irregularly shaped fields. If the hay is good, as it frequently is on first-cut, it is also physically impossible to reduce a 40 foot swath of forage into a 4 foot windrow, necessary to fit the throat of most balers.

In view of the above, there is a market for V-rakes of moderate width, having between 8 and 14 finger wheels. These rakes, like their bigger brothers, reduce the number of passes needed to rake a field, providing time and cost savings and enhancing the opportunity to perform the raking process when the forage is in its best condition and the weather is favorable. But moderate sized V-rakes also present a challenge to transport between fields, preparatory to which some mechanism must be provided for lifting the finger wheels out of contact with the ground and for collapsing the width of the heads.

There are many mechanisms for making a V-rake foldable. Some mechanisms lift the heads up at an angle, others pivot them above a vertical axis, and some require locking crazy wheels that support the ends of the frame. Most mechanisms, however, require the operator to get off his tractor and secure the unit in folded condition in some manner. Some V-rakes are not very stable when they are folded so that they must be towed at a relative slow speed to keep them from toppling over. This is a serious disadvantage as a small number of operators today farm large spreads and equipment must be moved as quickly as possible.

The industry standard for supporting the finger wheels consists of a rake arm pivoted from the support frame. An upstanding lever is welded to the rake arm adjacent the finger wheel spindle and a pipe is mounted on the frame. An extension spring is strung between the lever and the pipe with a chain passing though its core to prevent over extension. The chain also provides a means for raising the finger wheels for transport when the pipe is reciprocated on the frame. This operation also requires the operator to get off his tractor and set a pin in the pipe to secure the unit in raised position, the reverse operation being required when he wants to lower the finger wheels. Most farmers do not like to get off their tractors as time is money. In addition, not infrequently the chain links tangle as the finger wheels are raised. This causes the finger wheels to be held in partially raised position when they are lowered, requiring the operator to dismount and straighten out the tangle before starting raking.

BRIEF SUMMARY OF THE INVENTION

In view of the above, it is an object of the present invention to provide a V-rake with a mechanism for lifting the finger wheels and for collapsing the heads into transport position that does not require an operator to dismount from his tractor. Another object is to provide a V-rake that is stable in transport condition and can be towed at ordinary highway speeds. Other objects and features of the invention will be in part apparent and in part pointed out hereinafter.

In accordance with the invention, a folding finger wheel V-rake has a carrier and right and left movable heads. The carrier has a tongue and a main frame. The main frame has an elevated spine with a forward and a rearward end and a pair of outwardly and rearwardly flared, right and left ribs attached to the spine. Each of the ribs is connected to a folding arm with a hinge set at an angle to a longitudinal axis of the rib. The arm has a free end and folds upwardly and inwardly over the rib. The main frame is supported on a pair of struts mounted on wheels and the tongue ascends rearwardly and connects with the forward end of the spine.

The right and left movable heads are mounted on a post having first and second ends. The post is rotatably carried by its first end at the free end of the arm. The post is attached to a finger wheel support frame with a plurality of rake arm assemblies adapted for rotatable mounting finger wheels.

The right and left movable heads described above are movable by the folding arms between a first position where the finger wheels are in ground engaging position for raking and an elevated, upside down position for transport. In intermediate position, the same mechanism facilitating intermediate lifting of the finger wheels out of contact with the ground.

In a preferred embodiment, each of rake arm assembly has a shaft journaled to the support frame upon which a finger wheel is rotatably mounted. The shaft has first and second ends, with the first end attached to a rake arm and the second end attached to a crank arm.

The rake arm is angled away from the frame and has a free end adapted for mounting a finger wheel. A torsion spring is positioned on the shaft between the crank arm and the frame. The spring has first and second ends, with the first end attached to the support frame and the second end attached to the crank arm. The torsion spring is wound such that it applies a torque to the rake arm reducing the weight of the finger wheel on the ground, consistently over a wide vertical range. A stop is provided on the frame above the rake arm for preventing the rake arm from unwinding the torsion spring when the head is in upside down position for transport.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings corresponding reference characters refer to corresponding parts throughout the several views of the drawings in which one of various possible embodiments of the invention is illustrated:

FIG. 5 is a rear perspective view of a rake arm assembly for use with the folding finger wheel V-rake with the finger wheel spindle and hub shown in full lines and the finger wheel in broken lines;

FIG. 6 is a top view of the rake arm assembly; and,

FIG. 7 is a rear side view of the rake arm assembly.

DETAILED DESCRIPTION OF THE INVENTION

Figure 1:
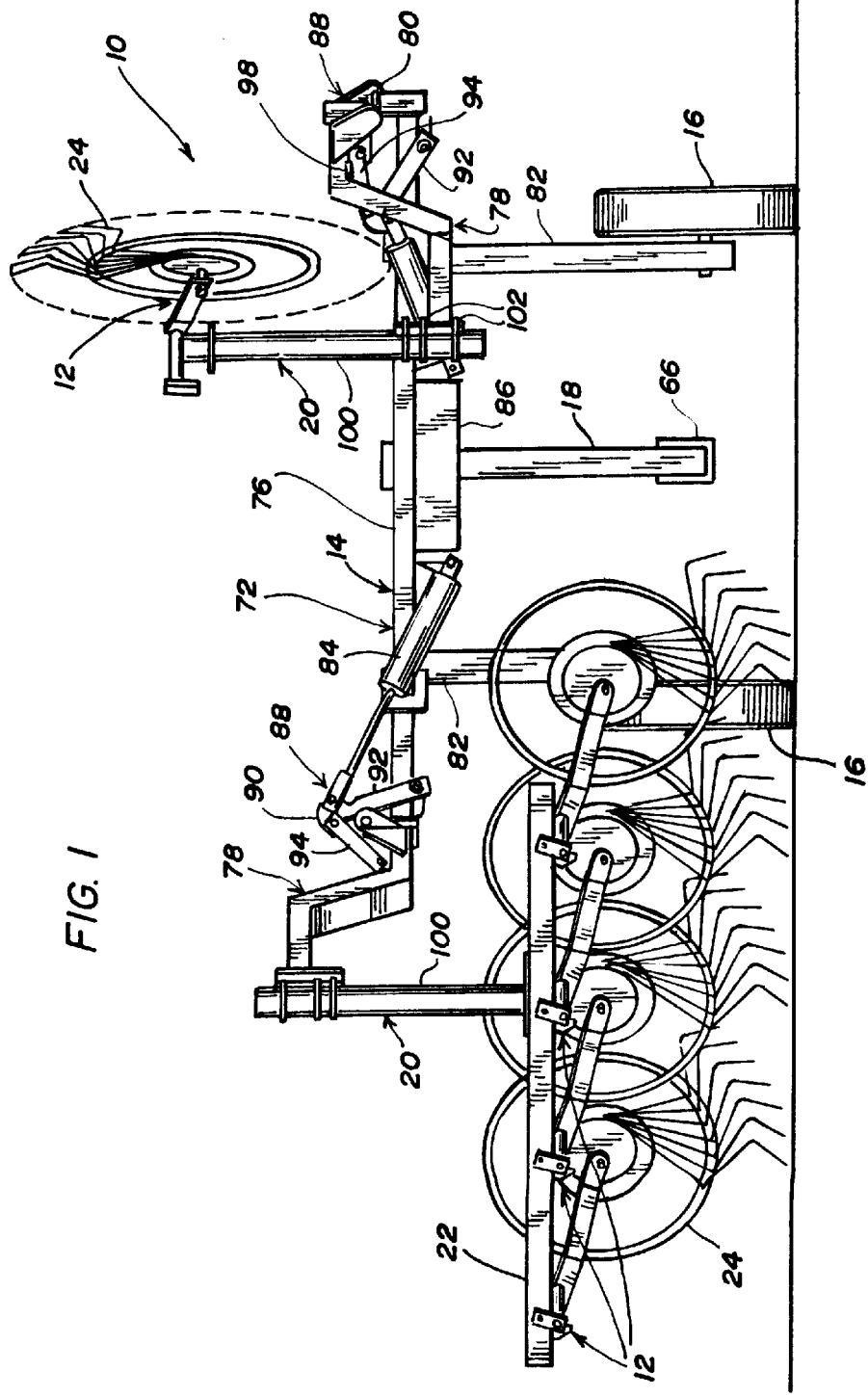
FIG. 1 is a rear elevational view of a folding finger wheel V-rake in accordance with the present invention, illustrated with a movable left head in operating position and a movable right head in upside down position for transport.
Figure 2:
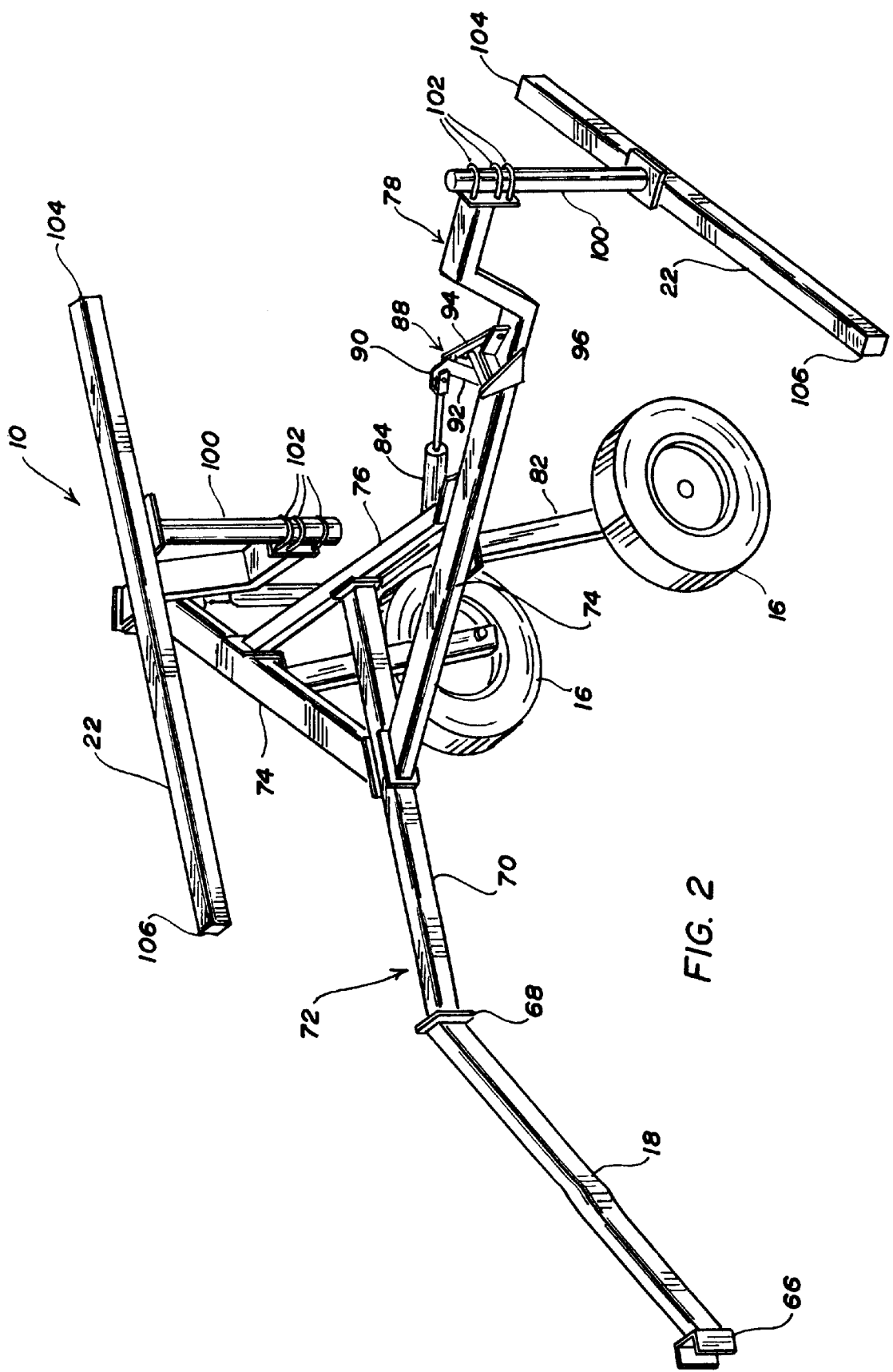
FIG. 2 is a perspective view of the V-rake with the finger wheels and rake arm assemblies removed for clarity.
Figure 3:
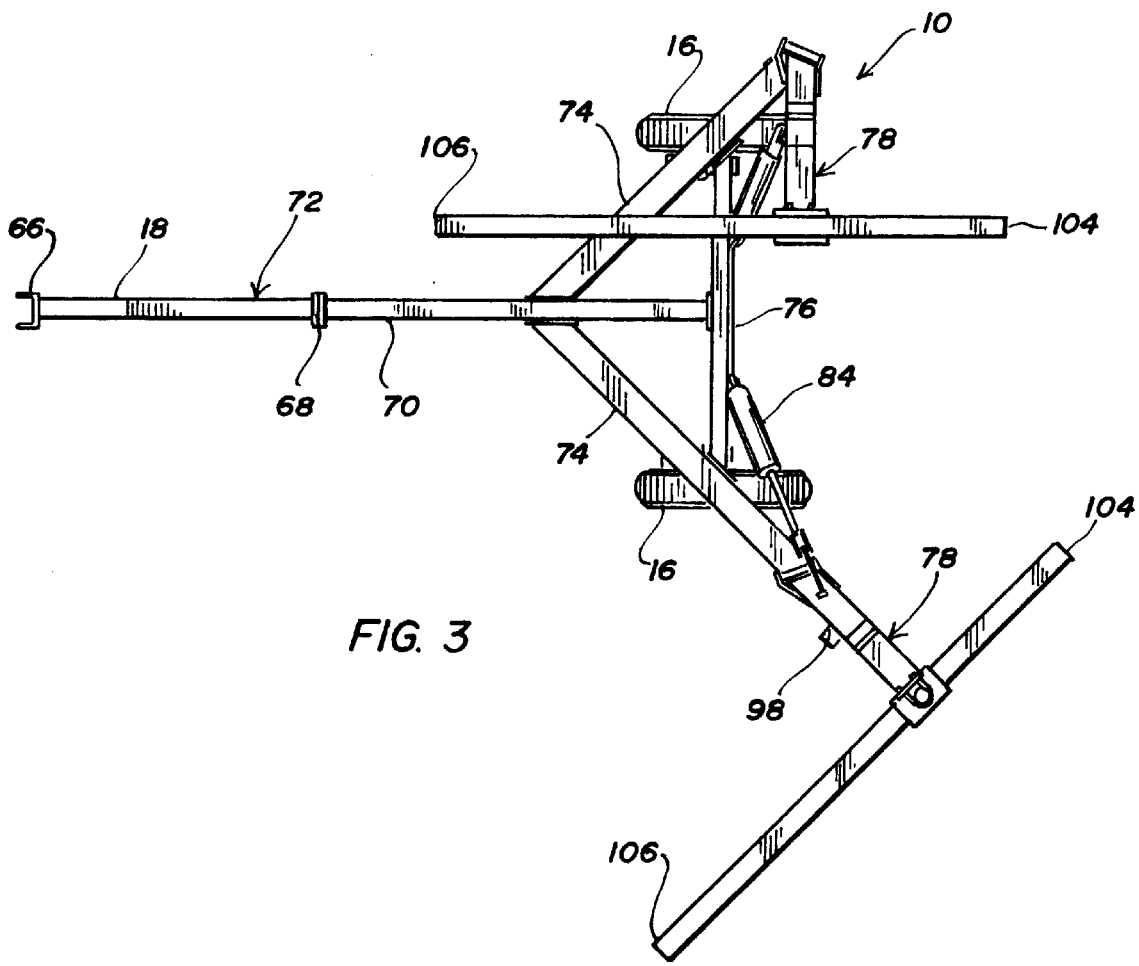
FIG. 3 is a top view of the V-rake.

Referring to the drawings more particularly by reference character, reference numeral 10 refers to a folding finger wheel V-rake in accordance with the present invention. In major part, V-rake 10 includes a carrier 14 and right and left movable heads 20.

Carrier 14 has a tongue 18 with a forward and a rearward end. The forward end has an ordinary agricultural hitch 66 for attachment of V-rake to a towing vehicle with a compatible drawbar. Most preferably, when V-rake is to be used for raking, the tow vehicle is a farm tractor or equivalent device with the additional capability to provide quick connections to the intake and outlet of a hydraulic fluid pressuring system, as V-rake is hydraulically folded and unfolded as more particularly described below. It should be noted, however, that for transport, in the folded condition, V-rake may be towed by a truck or some other vehicle lacking such hydraulic systems and is stable enough to travel at rates up to the speed limit.

Tongue 18 ascends gradually rearwardly from the relatively low elevation of the tow vehicle draw bar to an elevation roughly chest high and connects at a flanged bend 68 to a spine 70 of a main frame 72. The elevation of main frame 72 is important for avoiding interference and potential trapping of cut forage under carrier 14 during raking operations. A pair of outwardly and rearwardly flared, right and left, ribs 74 are attached to spine 70 intermediate its front and rear ends. A tie beam 76 connects the rear end of spine 70 with ribs 74, stiffening the ribs along their length. Ribs 74 are preferably at right angles to each other, making equal, but opposite, 22½ degree angles with spine 70. Each of ribs 74 is connected to a folding arm 78, with a horizontal hinge 80 set at an angle to a longitudinal axis of the rib. Each of arms 78 has a free end and folds upwardly and inwardly. When hinge 80 makes a 22½ degree angle with the longitudinal axis of rib 74, arms 78 form a right angle when folded over ribs 74 with the free ends generally opposing. Arms 78 are preferably Z-shaped so that the free ends are at a lower elevation than ribs 74 when the arms are folded to reduce the height of V-rake 10 in transport. Main frame 72 is supported on a pair of struts 82 mounted on right and left wheels 16. Wheels 16 have fixed axles, projecting outboard from struts 82 and are oriented for forward travel. This spacing of the wheels results in better stability and less likelihood that the wheels will become entangled in the forage being raked. Struts 82 are positioned under ribs 74 so that the center of gravity of the rake is between them and hitch 66 and the rake has no tendency to tip over backward when it is disconnected from the towing vehicle.

Arms 78 are folded and unfolded on main frame 72 hydraulically, powered off the hydraulic system of the towing vehicle as aforementioned. For this purpose, opposite ends of a hydraulic cylinder 84 are pinned to a bracket 86 attached intermediate an underside of tie beam 76 and to a linkage assembly 88 with a coupler 90. Linkage assembly 88 includes a lever 92 and a link 94, each of which is pivoted to coupler 90. Lever 92 is pivoted to rib 74 and link 94 to an upstanding angled bracket 96 provided on an upper surface of arm 78 adjacent hinge 80 such that the force applied to arms 78 is on centerline of them. A stop 98, which rests on linkage assembly 88 as cylinder 84 bottoms out, is provided on arm 78. As will be readily appreciated, when cylinders 84 are connected to the intake and outlet of the hydraulic fluid pressuring system of the tow vehicle, arms 78 can be folded and unfolded as shown in broken lines in FIG. 4. It will also be apparent that right and left arms can be deployed separately. This may be useful, for example, when V-rake be used to begin a windrow at the edge of a field or for narrow or small strips where the entire width of V-rake would preclude operations.

Right and left movable heads 20 include vertical posts 100 which are rotatably mounted with clamps 102 to the free end of arms 78. Posts 100 have first and second ends, the second end of which is attached to a finger wheel support frame 22. In the form illustrated in the drawings, support frame 22 is a horizontal beam having heel and toe ends 104, 106, respectively, and having a plurality of rake arm assemblies 12 adapted for rotatably mounting finger wheels 24. The optimum angle of inclination between the support frames is about 90 degrees with the spacing between heels 104 such that the windrow is between 4 and 5 feet wide, that being the throat size of most balers. If support frames are at 90 degrees to each other in working position, they are parallel when arms 78 are folded. If a wider or narrower windrow is desired, the angle between support frames 22 can be changed by rotating posts 100 in clamps 102, moving heels 104 closer or further apart. There is a limit, however, as to how close or far apart heels 104 can be, as above certain angles of inclination support frames 22 will hit together when arms 78 are folded.

It will be understood that V-rake may be used with conventional rake arm assemblies supported with extension springs. It is preferred, however, that rake arm assembly have a torsion spring. In which case, as shown in FIGS. 3–7, rake arm assembly 12 in major part includes a shaft 26 journaled to support frame 22, a rake arm 28 upon which is mounted finger wheel 24, a crank arm 30 and a torsion spring 32. As shown in the drawings, shaft 26 is journaled in a spindle tube 34 welded to the underside of support frame 22. Tube 34 is set at an angle to a long axis of support frame 22, sloped in the direction of travel, the industry standard being about 10 degrees from perpendicular. A bushing, preferably Teflon coated and resistant to deformation on standing over the winter, may be provided in tube 34.

Shaft 26 has first and second ends 36, 38, respectively, first end 36 making right angled attachment to rake arm 28 and second end 38 to crank arm 30. First end 36 of shaft 26 may be welded to rake arm 28 since it need not be disassembled in use, while second end 38, as best seen in FIGS. 5 and 7, is preferably attached to one end of crank arm 30 with a key 40 held in place with a set screw 42.

Rake arm 28 has first and second ends 44, 46, respectively, first end 44, as aforementioned, is attached to first end 36 of shaft 26. Second end 46 is adapted for mounting a wheel axle 48 of finger wheel 24 parallel with shaft 26, one such possible arrangement being shown in the drawings. Rake arm 28, when viewed from above as in FIG. 6, has a relaxed Z-shape with legs 50 and spine 52. Legs 50 make the same but opposite angle as tube 34 with respect to the long axis of support frame 22 and spine 52 angles away so that finger wheels run parallel and overlap with each other but do not hit.

Torsion spring 32 is provided on shaft 26 between crank arm 30 and support frame 22. Torsion spring 32 is a closed coil helical spring with first and second ends 56, 58, respectively, designed to provide a torque when load is exerted on the ends. As shown in FIG. 5, torsion spring 32 is wound clockwise for use on support frame 22 mounted on the left side of carrier 14. It will be readily appreciated that rake arm assembly 12 on the right side of carrier 14 is of opposite hand and torsion springs are, accordingly wound counterclockwise.

Figure 4:
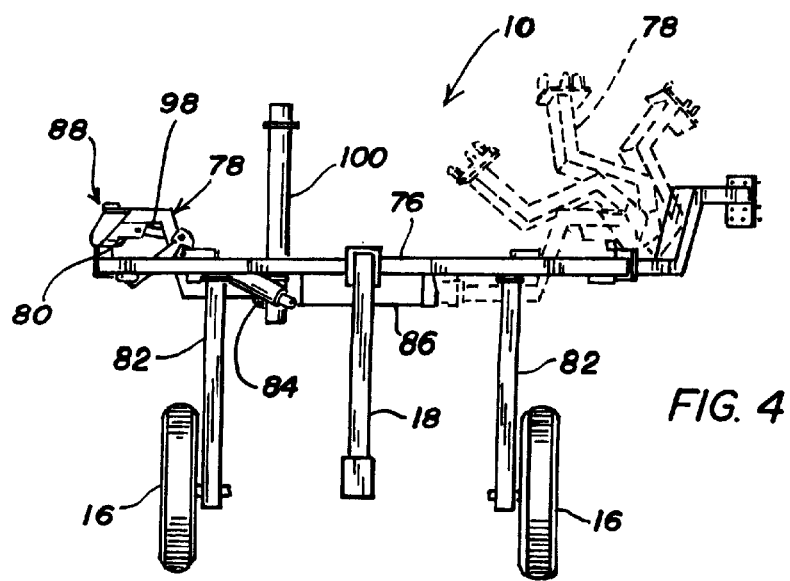
FIG. 4 is a front elevation view of the V-rake.

First end 56 of torsion spring 32 is attached to support frame 22 and second end 58 is attached to crank arm 30 distal its attachment to shaft 26. In simple form, first and second ends 56, 58 are received in holes provided in the frame and crank arm for that purpose. First end 56 resists the twisting forces applied by the spring to rake arm 28. To adjust the applied load, an adjustment bracket 60 is attached to support frame 22 and spindle tube 34. As best seen in FIG. 4, adjustment bracket 60 has a plurality of holes, the highest hole giving the least support to rake arm 28, while the lowest hole provides the most support, as might be suitable for raking something light and fluffy, like wheat straw. Adjustment of first end 56 of torsion spring 32 in bracket 60 is made by releasing set screw 42 and removing key 40, freeing the spring from crank arm 30. First end 56 of torsion spring 32 can then be removed from bracket 60 and reinserted in a selected hole, followed by insertion of second end 58 in crank arm 30 and reattachment of the crank arm on shaft 26.

Other ways of adjusting the load on torsion spring 32 will readily occur to those skilled in the art. For example, an elongated slot could be substituted for the holes shown in bracket 60 with an eye bolt provided for securing end 56 in selected position. This arrangement eliminates the need for releasing set screw 42 and removing key 40, eliminating the risk that these small parts might be lost on the ground.

When rake arm assembly 12 is used on a carrier 14 such as shown in FIG. 1, a stop 62 is provided on support frame 22 above each rake arm 28. In use, stop 62 prevents upward rotation of rake arm 28 beyond a predetermined amount. It also prevents the rake arm from unwinding torsion spring 32 when support frame 22 is rotated upside down for transport.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A folding finger wheel V-rake comprising a carrier and a right and left movable head, said carrier having a tongue and a main frame, said main frame having an elevated spine with a forward and a rearward end and a pair of outwardly and rearwardly flared, right and left ribs attached to the spine, each of said ribs connected to a folding arm with a hinge set at an angle to a longitudinal axis of each said rib, said arm having a free end and folding upwardly and inwardly into inverted resting position on each said rib, said tongue ascending rearwardly and connecting with the forward end of the spine, each of said right and left movable heads mounted on a post having first and second ends, said post rotatably carried by its first end at the free end of the arm, said post attached to a finger wheel support frame, said finger wheel support frame having a plurality of rake arm assemblies adapted for rotatably mounting finger wheels, whereby said right and left movable heads are movable by the folding arms between a first position where the finger wheels are in ground engaging position for raking and an elevated, upside down position for transport with the finger wheels and posts generally vertical said movable heads lifting the finger wheels out of contact with the ground in intermediate position.

2. The V-rake of claim 1 further comprising a tie beam connecting the rear end of the spine with the ribs.

3. The V-rake of claim 2 wherein each of the folding arms is Z-shaped so that the free end is at a lower elevation than the ribs when the arms are folded.

4. The V-rake of claim 3 further comprising a hydraulic cylinder for folding and unfolding each arm over the rib.

5. A folding finger wheel V-rake comprising a carrier and a right and left movable head, said carrier having a tongue and a main frame, said main frame having an elevated spine with a forward and a rearward end and a pair of outwardly and rearwardly flared, right and left ribs attached to the spine, a tie beam connecting the rear end of the spine with the ribs, each of said ribs connected to a folding arm with a hinge set at an angle to a longitudinal axis of each said rib, said arm having a free end and folding upwardly and inwardly into inverted resting position on each said rib, a hydraulic cylinder pinned between the tie beam and each folding arm for folding and unfolding the arm, said tongue ascending rearwardly and connecting with the forward end of the spine, each of said right and left movable heads mounted on a post having first and second ends, said post rotatably carried by its first end at the free end of the arm, said post attached to a finger wheel support frame, said finger wheel support frame having a plurality of rake arm assemblies adapted for rotatably mounting finger wheels, whereby said right and left movable heads are movable by the folding arms between a first position where the finger wheels are in ground engaging position for raking and an elevated, upside down position for transport with the finger wheels and posts generally vertical, said movable heads lifting the finger wheels out of contact with the ground in intermediate position.

6. The V-rake of claim 5 wherein each of the folding arms is Z-shaped so that the free end is at a lower elevation than the ribs when the arms are folded.

7. The V-rake of claim 6 wherein each rake arm assembly on the support frame comprises a shaft journaled to the frame, said shaft having first and second ends, said first end attached to a rake arm and said second end attached to a crank arm;

said rake arm angled away from the frame and having a free end adapted for mounting a finger wheel; and, a torsion spring on the shaft between the crank arm and the frame, said torsion spring having first and second ends, said first end attached to the frame and said second end attached to the crank arm, said torsion spring wound such that it applies a torque to the rake arm reducing the weight of the finger wheel on the ground over a wide vertical range whereby the finger wheel stays in contact with the ground and rides over mounds without bending the fingers.

8. The V-rake of claim 7 further comprising a stop on the frame above the rake arm for preventing the rake arm from unwinding the torsion spring.

9. The V-rake of claim 8 wherein the crank arm is attached to the shaft with a key.

10. The V-rake of claim 9 further comprising a bracket attached to the frame for adjusting a load on the torsion spring by changing the position of the first end of the torsion spring with respect to the second end.

* * * * *